(12) United States Patent
Roessler et al.

(10) Patent No.: US 9,158,438 B2
(45) Date of Patent: Oct. 13, 2015

(54) MULTI-LEVEL USER INTERFACE THEMING ENGINE

(71) Applicants: Andreas Roessler, Speyer (DE); Uwe D. Klinger, Bad Schoenborn (DE)

(72) Inventors: Andreas Roessler, Speyer (DE); Uwe D. Klinger, Bad Schoenborn (DE)

(73) Assignee: SAP SE, Walldorf (DE)

( * ) Notice: Subject to any disclaimer, the term of this patent is extended or adjusted under 35 U.S.C. 154(b) by 176 days.

(21) Appl. No.: 14/027,957

(22) Filed: Sep. 16, 2013

(65) Prior Publication Data

US 2015/0082214 A1 Mar. 19, 2015

(51) Int. Cl.
G06F 3/0484 (2013.01)
G06F 3/0481 (2013.01)
G06F 3/0482 (2013.01)

(52) U.S. Cl.
CPC .......... *G06F 3/04842* (2013.01); *G06F 3/0481* (2013.01); *G06F 3/0482* (2013.01)

(58) Field of Classification Search
CPC .. G06F 3/0481; G06F 3/0482; G06F 3/04842
USPC ........................................................ 715/765
See application file for complete search history.

(56) References Cited

U.S. PATENT DOCUMENTS

| | | | |
|---|---|---|---|
| 5,838,775 A * | 11/1998 | Montalbano | |
| 6,054,986 A * | 4/2000 | Kato | ............... 700/83 |
| 6,188,399 B1 * | 2/2001 | Voas | .............. 715/723 |
| 6,307,574 B1 | 10/2001 | Ashe et al. | |
| 6,633,315 B1 | 10/2003 | Sobeski et al. | |
| 6,753,885 B2 | 6/2004 | Stoakley et al. | |
| 7,028,262 B2 | 4/2006 | Estrada et al. | |
| 7,131,064 B2 | 10/2006 | Dencker et al. | |
| 7,188,342 B2 | 3/2007 | DeMello et al. | |
| 7,340,722 B2 | 3/2008 | Dencker et al. | |
| 7,412,658 B2 | 8/2008 | Gilboa | |
| 7,490,295 B2 | 2/2009 | Chaudhri et al. | |
| 7,519,914 B2 | 4/2009 | Fernandez et al. | |
| 7,620,890 B2 | 11/2009 | Dietl et al. | |
| 7,685,526 B2 | 3/2010 | Klinger | |
| 7,712,025 B2 | 5/2010 | Roessler | |
| 7,831,931 B2 | 11/2010 | Klein et al. | |
| 7,882,440 B2 | 2/2011 | Mohr | |
| 7,917,860 B2 | 3/2011 | Gossman | |
| 8,458,608 B2 | 6/2013 | Raiz et al. | |
| 2003/0164850 A1 | 9/2003 | Rojewski et al. | |
| 2004/0223009 A1 | 11/2004 | Szladovics et al. | |
| 2005/0071308 A1 | 3/2005 | Wedel et al. | |
| 2005/0071753 A1 | 3/2005 | Klein et al. | |
| 2005/0071777 A1 | 3/2005 | Roessler et al. | |
| 2005/0081105 A1 | 4/2005 | Wedel et al. | |
| 2005/0081121 A1 | 4/2005 | Wedel et al. | |
| 2005/0086608 A1 | 4/2005 | Roessler | |
| 2005/0102632 A1 | 5/2005 | Klinger et al. | |
| 2005/0108333 A1 | 5/2005 | Scholz et al. | |
| 2005/0132337 A1 | 6/2005 | Wedel et al. | |
| 2009/0313550 A1 * | 12/2009 | Kim | |
| 2010/0005407 A1 * | 1/2010 | Liu | ............................. 715/764 |

(Continued)

*Primary Examiner* — Anil Bhargava

(74) *Attorney, Agent, or Firm* — Fish & Richardson P.C.

(57) ABSTRACT

The present disclosure describes methods, systems, and computer program products for providing a multi-level user interface theming engine. One computer-implemented method includes initiating a start of a user interface following receipt of a theming request, requesting available themes for presentation in the user interface, receiving a request to access an existing theme, receiving theming data responsive to a generated request to load the existing theme, and receiving a request to publish modified theming data.

20 Claims, 4 Drawing Sheets

(56) References Cited

U.S. PATENT DOCUMENTS

| | | | |
|---|---|---|---|
| 2011/0012929 A1* | 1/2011 | Grosz | 345/661 |
| 2012/0023421 A1 | 1/2012 | Demant et al. | |
| 2013/0195429 A1* | 8/2013 | Fay | |
| 2014/0096015 A1* | 4/2014 | Grosz | 715/738 |
| 2014/0282128 A1 | 9/2014 | Zhang | |

* cited by examiner

MULTI-LEVEL USER INTERFACE THEMING ENGINE

CROSS-REFERENCE TO RELATED APPLICATIONS

This application is related to co-pending application U.S. Ser. No. 14/027,831 filed on Sep. 16, 2013, entitled "Multi-Level User Interface Theming," the entire contents of which are hereby incorporated by reference.

BACKGROUND

Branding, or theming, is the ability to adapt an application to a desired visual look and/or operation. For example, a company's web application style guide may require that all internal/external webpages associated with company web-based applications use a particular color and menu style. This ensures, among other things, recognition and familiarly among users of the web-based applications. However, web-based applications are generally designed to be offered to and for use by multiple customers and are not generally designed with future style-guide-required theming changes as a consideration. As a result, later-required theming changes require time consuming and expensive software development/modification and/or testing of software artifacts at multiple architectural levels to ensure consistency and proper functionality. The necessary software development/testing increases a total cost of ownership for web-based applications and can result in the abandonment a re-theming effort and/or the use of a different web-application.

SUMMARY

The present disclosure relates to computer-implemented methods, computer-readable media, and computer systems for providing a multi-level user interface theming engine. One computer-implemented method includes One computer-implemented method includes initiating a start of a user interface following receipt of a theming request, requesting available themes for presentation in the user interface, receiving a request to access an existing theme, receiving theming data responsive to a generated request to load the existing theme, and receiving a request to publish modified theming data.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the user interface starts the theming engine.

A second aspect, combinable with any of the previous aspects, wherein the available themes are requested using a file abstraction application programming interface.

A third aspect, combinable with any of the previous aspects, wherein the theming data is loaded based on a contextual state of the user interface.

A fourth aspect, combinable with any of the previous aspects, wherein the modified theming data indicates a modified theme associated with the existing theme.

A fifth aspect, combinable with any of the previous aspects, further comprising determining whether the existing theme is a base theme.

A sixth aspect, combinable with any of the previous aspects, further comprising updating a custom theme on a determination that the existing theme is not a base theme.

A seventh aspect, combinable with any of the previous aspects, further comprising generating a new theme including delta changes to be applied to the existing theme based on a determination that the existing theme is a base theme.

The subject matter described in this specification can be implemented in particular implementations so as to realize one or more of the following advantages. First, a theming infrastructure allows modifications to be made to UI components and/or controls to provide multiple levels of user interface (UI) theming control. The theming levels can be easily understood by users and require less training to work with. For example, upper theming levels provide simple, high-coverage settings affecting many UI components and/or controls, while lower theming levels provide sophisticated settings that affect specific UI components and/or controls. Users with more advanced training can work with lower levels, while other users can stay within the confines of upper levels. Second, the theming infrastructure is flexible and allows efficient theming changes based only on a user's needs. For example, user needs may vary from changing an overall color of a web-based standard application background to specific changes to a particular web-based standard application component. Third, the theming infrastructure allows simple as well as sophisticated changes to be made easily and inexpensively without the need for extensive software development and/or testing. Fourth, the theming infrastructure is portable and designed to work with different UI technologies, components, and/or controls. Fifth, the theming infrastructure is extendable and allows the addition of existing and future UI technologies, components, and/or controls. Sixth, the theming infrastructure provides an each-to-use and feature-rich application programming interface (API). Seventh, the theming infrastructure allows for the protection of an investment in legacy theming infrastructures by providing tools/functionality to convert a legacy theming infrastructure to be in compliance with the herein described theming infrastructure. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
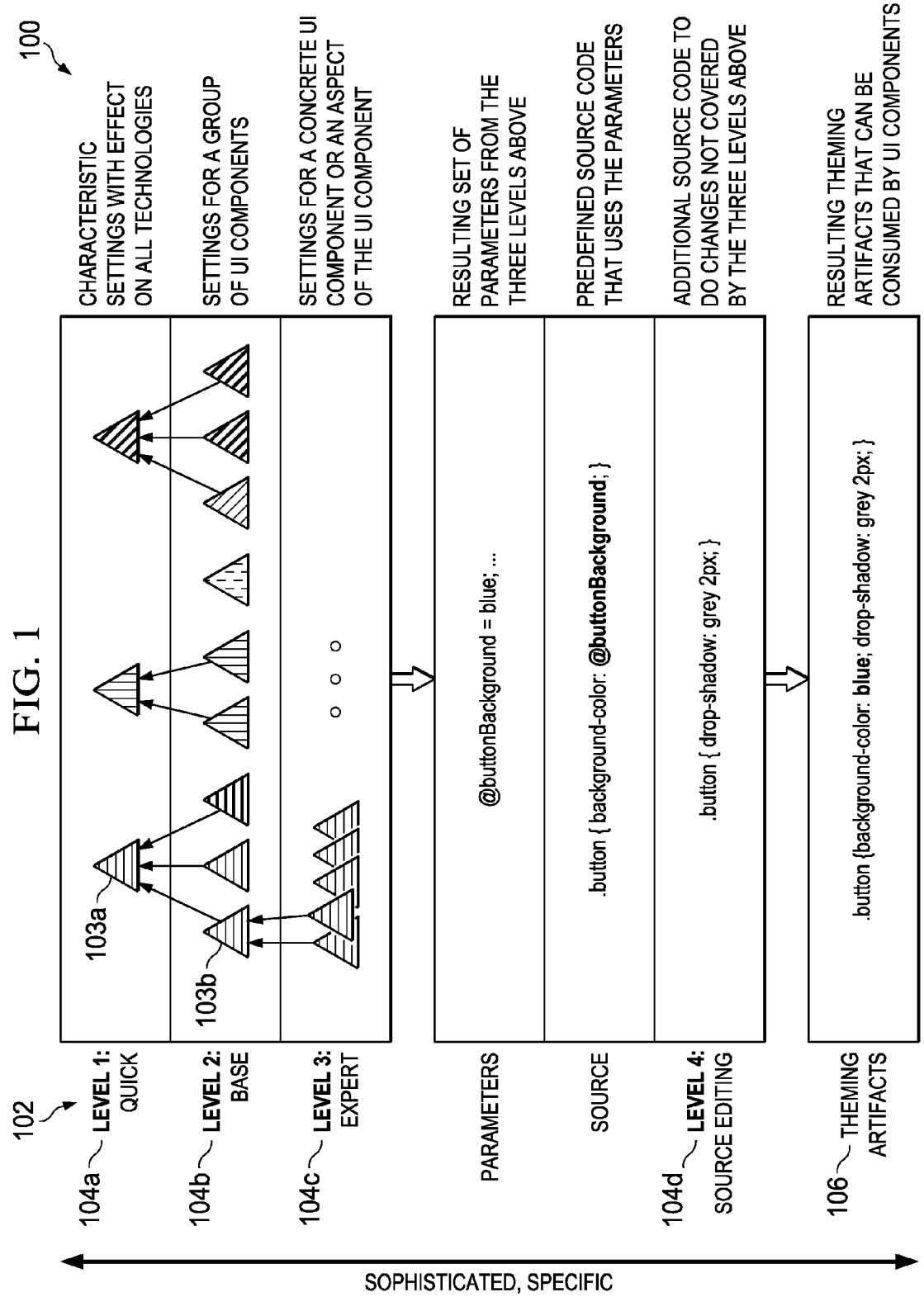
FIG. 1 is a block diagram illustrating example user interface theming levels according to an implementation.

This disclosure generally describes computer-implemented methods, computer-program products, and systems for providing a multi-level user interface theming engine. The following description is presented to enable any person skilled in the art to make and use the invention, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

For purposes of this disclosure, a "user interface (UI) component" is a building block to assemble UIs. UI components can be specific to a use case or re-usable. Examples for re-usable UI components are UI controls such as buttons or input field. For purposes of this disclosure, a "theming artifact" is data supplied to a UI component interface to describe a desired look for the UI component. Examples of theming artifacts include images used for background, color values or more general cascading style sheet (CSS) files. For purposes of this disclosure, a "theme" is a collection of theming artifacts (e.g., stored in source and/or runtime files) following a similar "look." For example there is an example "XYZ" theme can use different shades of grey and the color blue for UI component highlights. Every supporting control supports a "XYZ" theme "look." For purposes of this disclosure, a "theming parameter" steers the visualization of one or multiple UI components, such as a button. A theming parameter can be for example the background color of the button. For purposes of this disclosure, "theming source code" is machine readable code used to define the visualization of UI components. It can be interpreted directly by a UI component or may require a processing step, such as compilation, interpretation, etc. For example, a CSS format can be directly interpreted by web browsers for HTML UI components. A UI component consisting of HTML code can be themed in this manner. In another example, the LESS dynamic style sheet language format needs a compilation step to generate CSS code.

Branding, or theming, is the ability to adapt an application to a desired visual look and/or operation. For example, a company's web application style guide may require that all internal/external webpages associated with company web-based applications use a particular color and menu style. This ensures, among other things, recognition and familiarly among users of the web-based applications. However, web-based applications are generally designed to be offered to and for use by multiple customers and are not generally designed with future style-guide-required theming changes as a consideration. As a result, later-required theming changes require time consuming and expensive software development/modification and/or testing of software artifacts at multiple architectural levels to ensure consistency and proper functionality. The necessary software development/testing increases a total cost of ownership for web-based applications and can result in the abandonment a re-theming effort and/or the use of a different web-application.

Customers are increasingly requiring easy and consistent methods to perform multiple levels of branding across applications. While some customers only want to perform basic changes, such as updating the color of an application background or putting a company logo on a web page, other customers want to apply a sophisticated style guide to an application that requires the change of many details associated with a UI. Customers also want the ability to possible to patch or upgrade application without the need to perform/repeat a full theming process.

Further, web-based applications typically use standard control sets that can be changed by applying updates or bug fixes. The changes may then have effect on current theming and a method to reduce the effect of the changes is desirable.

The theming infrastructure described below supports both requirements with low total cost of ownership (TCO) for the customer by providing multiple levels of theming functionality in a single infrastructure. Upper theming levels provide simple, high-coverage settings affecting many UI components and/or controls, while lower theming levels provide sophisticated settings that affect specific UI components and/or controls.

FIG. 1 is a block diagram 100 illustrating example user interface theming levels 102 according to an implementation. The described multi-level theming infrastructure consists at least of two or more theming levels. The described four-theme-level approach appears to provide an optimal level of flexibility, efficiency and reduced complexity. As will be appreciated by those of skill in the art, more or less theming levels are also applicable to the described subject matter and within the scope of the disclosure.

Theming Levels

Four theming levels are illustrated in FIG. 1: Level 1: Quick Theming 104a, Level 2: Base Theming 104b, Level 3: Expert Theming 104c, and Level 4: Source Editing 104d. As can be seen, changing a parameter 103a for a UI component at Level 1, results in the similar change being reflected down to parameters for UI components at Level 2 and Level 3 bound to parameter 103a. In other words, the finer-grained parameters (e.g., at Level 2) take values from less fine-grained parameters (e.g., at Level 1). Similarly, changes a parameter at Level 2 at 103b affect associated parameters for UI components at Level 3 bound to parameter 103b. Note that changes flow from course to fine-grain parameters and changes made to Level 2 or Level 3 are not reflected upwards to the level above the level changes are made in.

Level 1: Quick Theming

Quick Theming (QT) 104a provides the maximum effect on UIs with a minimal effort for a user. A parameter is user-accessible, exposed property (e.g., font, color, etc.) associated with a UI application. QT parameters are basic/technology-agnostic parameters, such as a base font size or a logo image and can be specific to a theme and are changed to reach basic UI component settings. Example QT parameters from an example "XYZ" theme can include:

"Highlight color" for highlighted elements
button hover color, select color, focus outline, etc.
Color of monochrome icons
"Branding color" for branding elements
"Font"—The main font for all applications
"Font size"—The base font size for normal text "Background color"—The page background color
"Background image"—The page background image
"Logo image"—The company logo for display in the page header For example, the "XYZ" theme can have a reduced coloring theme where most elements are greyish in nature. In this theme, all other colors parameters are variations of a "Highlight color" parameter. By providing the "Highlight color" using the theming infrastructure, all the usage instances of "Highlight color" color (and associated variations) can be modified. Because of the technology-agnostic character of parameters such as "Highlight color," the parameter can be applied to all UI libraries and their components that the theming infrastructure affects. QT parameters/values have global scope and should be accessible by any UI component.

A new theme can be provided by changing the QT parameters that are provided by an existing theme. All UI technologies that provide theming for this existing theme and that use the QT parameters will have their look adjusted accordingly. Additional parameters can be added in the future and adapted to evolving UI technologies.

Level 2: Basic Theming

Basic Theming (BT) 104b consists of parameters specific to groups of controls. They have a more clearly defined semantic meaning for a UI, are still technology independent, and provide functionality for more detailed changes to a target UI component than possible with QT parameters. However, BT parameters may not be relevant for all technologies. Example BT parameters from the example "XYZ" theme can include:

Button background
Button border
Group background
Input background
Disabled background In some implementations, by default, the value of a BT parameter can be derived from one or more QT parameters. This ensures that changing a QT parameter will affect a BT parameter as well. Deriving of a BT parameter value can be either direct (e.g., same value as a QT parameter) or using a formula to calculate the BT parameter value. In some implementations, BT parameters can also have a fixed value. In these implementations, the fixed-value BT parameter is not affected by changes to QT parameters. In some implementations, there are more BT parameters than QT parameters. Similar to QT parameters, BT parameters/values have global scope and should be accessible by any UI component.

Level 3: Expert Theming

Expert Theming (ET) 104c consists of parameters that are individual settings for a particular UI technology or for a particular UI component/control aspect that cannot be changed using QT and/or BT parameters. For example, ET encompasses parameters to control individual CSS-style properties of controls and their applicable different states. In some implementations, different control states can require different visualizations. For example, for an emphasized button on a UI, the background of the button should be different then of a standard state button in order to express emphasis of the emphasized button. Example ET parameters from the example "XYZ" theme can include:

Standard button background
Standard button border
Emphasized button background
Emphasized button border
"Next" icon
"Save" icon In some implementations, the list of ET parameters is larger than either the QT and/or BT parameters. A reasonably defined set of QT and BT parameters can reduce the need to modify ET parameters to those cases where QT and/or BT parameters are not sufficient for a theming effort.

As with BT parameters, ET parameters can be derived from other parameters or set to a fixed value. For example, in some implementations, ET parameters can be derived only from other ET parameters to ensure a consistent method of expert level theming. For example, QT or BT can be used to shift the color of images on a UI (e.g. "Next" or "Save" icon), while at the expert level, ET can be used to replace the image. ET parameters/value have only a local scope.

Note that FIG. 1 illustrates that from Levels 1-3, a resulting set of parameters is generated; here, "@buttonBackground=blue; . . . . " Theming source code is also shown that uses the example parameter @buttonBackground; here ".button {background-color: @buttonBackground;}."

Level 4: Source Editing

Although parameters used with QT, BT, and/or ET should cover most theming scenarios, some parameters may not be handled/available through QT, BT, and/or ET parameters. For example the "XYZ" theme can provide ET parameters to set background colors for all variants of a button but not to set a UI drop shadow with respect to the button. In this instance, a user needs to be able to perform source code editing (SE) 104d to edit the theming source code of the theming artifacts, in this example the CSS files, directly. As illustrated, the Source described above following Level 3: Expert Theming, needs to be modified to include a "drop-shadow: grey 2px;" parameter. Theming artifact 106 shows the modification made to the theming source code following SE at Level 4 104d. Note that edits of theming source code at level 4 have only a local scope. The modified theming artifact can be consumed by UI components.

It is also necessary to ensure that there are no conflicts between the predefined theming source code (i.e., the source of the "XYZ" theme) and custom theming source code of a customized theme as a conflict might result in data loss from the customized theme. To address this issue, in some implementations, the theming source code of the customized theme is separated into at least three parts, although more or less source code parts are envisioned to be covered by the disclosure:

Source of standard theme
Parameter values from QT, BT and ET
Custom source code from SE A preprocessor then generates the final UI code by concatenating the various theming source code and processing it as follows to generate appropriate theming artifacts 106:

For each parameter, search for the last occurrence and calculate it according to its formula
Replace all occurrences of the parameter with the calculated value Scope of Parameters As QT and BT parameters/value have a global scope, they should be accessible to any UI component. As ET parameters/values have a local scope, they need only to be accessible to appropriate specific UI components and/or UI libraries using the ET parameters/values. Similarly, SE code has only local scope, and only needs to be accessible to appropriate specific UI components and/or UI libraries using the SE code.

QT/BT parameters can be defined to cover a complete or a reduced set of UI parameters/values of a particular theme depending upon the theming infrastructure implementation and/or UI implementation. For example, some themes may only have QT or BT parameters active while other themes may allow ET/SE modifications as well. In some implementations, modified themes are saved as customized themes while one or more source themes are protected from modification. In some implementations, parameters can be transferred in source code. Source code can be directly consumed by UI components/controls or require a compilation step prior to use.

Transparency of Levels

The multi-level theming approach allows use of all theming levels at the same time and simultaneously in a single theme. Any of the parameters available at each different level can be changed or kept at a default value. Generally, usage of upper theming levels will provide an easier and/or less-costly theming modification to a UI. Use of the upper theming levels will also reduce the risk that a theme is broken with ET and/or SE modifications, particularly if additional UI components/controls are added to a UI implementation and/or UI implementation details change.

The following described computer-implemented methods, computer-readable media, and computer systems provide, among other things, a multi-level user interface theming engine as described above. The theming engine maintains the lifecycle for branding and theming of multiple applications in a heterogeneous system landscape and minimizing total cost of ownership of applications. Applications may be delivered by different parties and use different technology platforms. The theming engine is part of an overall theming framework including, among other things: A memory containing theming data, an API to create/modify theming data according to the different described theming levels, and applications using the theming data to display the specified theme.

Figure 2A:
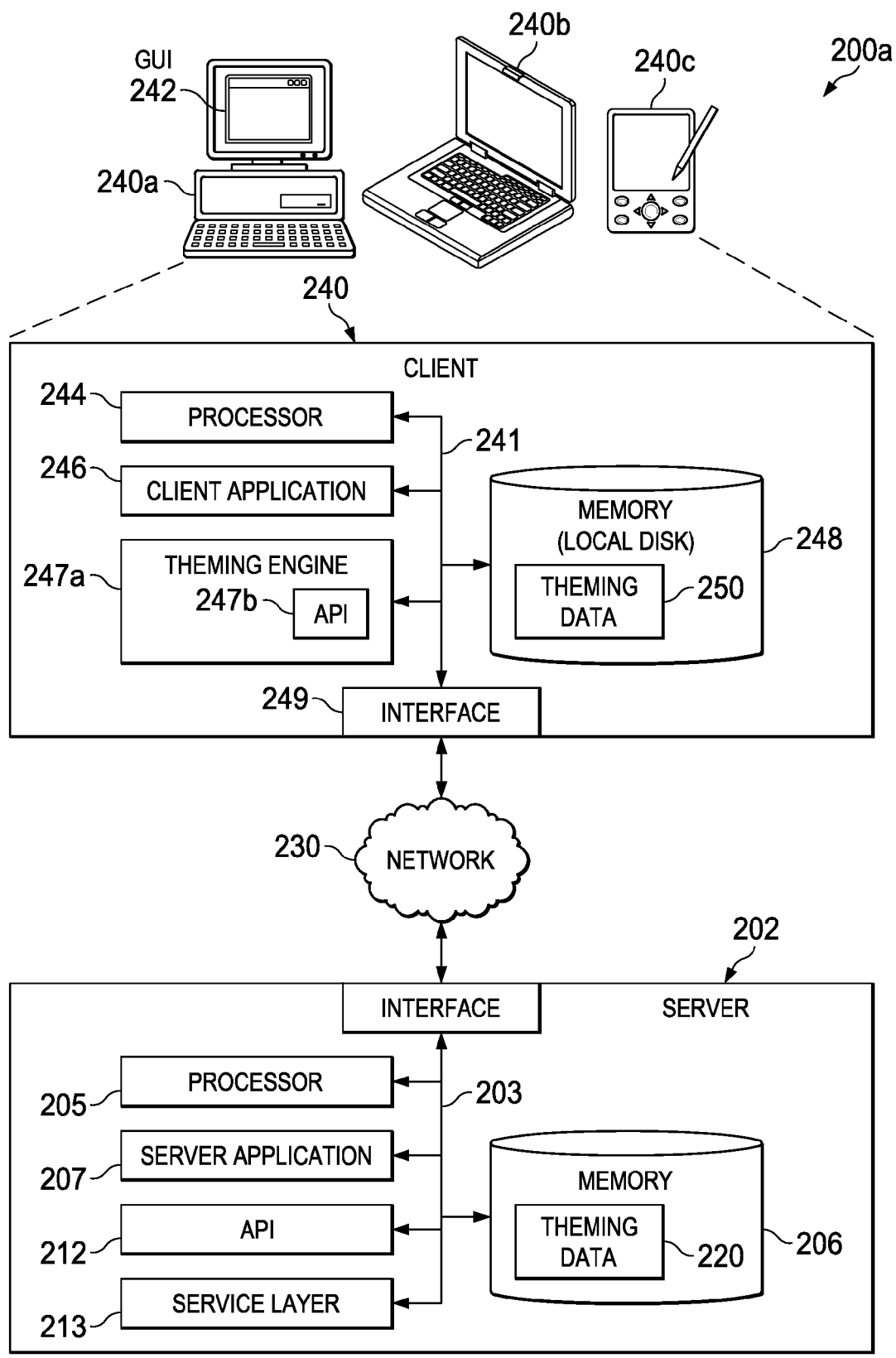
FIG. 2A is a block diagram illustrating an example distributed computing system (EDCS) for providing a multi-level user interface theming engine according to an implementation.

FIG. 2A is a block diagram illustrating an example distributed computing system (EDCS) 200a for providing multi-level user interface theming according to an implementation. The illustrated EDCS 200a includes or is communicably coupled with a server 202 and a client 240 that communicate across a network 230. In some implementations, one or more components of the EDCS 200a may be configured to operate within a cloud-computing-based environment.

At a high level, the server 202 is an electronic computing device operable to receive, transmit, process, store, or manage data and information associated with the EDCS 200a. According to some implementations, the server 202 may also include or be communicably coupled with an application server, e-mail server, web server, caching server, streaming data server, business intelligence (BI) server, and/or other server.

In general, the server 202 is a server that can provide at least a data storage/persistency for theming data 220 and a server application, such as an application server. Note that in some implementations, the server 202 is not necessarily the same server hosting an application using the theming data (or vice versa). The server 202 is responsible for receiving, among other things, requests over network 230 from a client application 246 and/or theming engine 247a/b associated with the client 240 of the EDCS 200a and responding to the received requests by processing the said requests in an appropriate application (whether illustrated or not). In addition to requests received from the client 240, requests may also be sent to the server 202 from internal users, external or third-parties, other automated applications, as well as any other appropriate entities, individuals, systems, or computers. In some implementations, various requests can be sent directly to server 202 from a user accessing server 202 directly (e.g., from a server command console or by other appropriate access method).

Each of the components of the server 202 can communicate using a system bus 203. In some implementations, any and/or all the components of the server 202, both hardware and/or software, may interface with each other and/or the interface 204 over the system bus 203 using an application programming interface (API) 212 and/or a service layer 213. The API 212 may include specifications for routines, data structures, and object classes. The API 212 may be either computer-language independent or dependent and refer to a complete interface, a single function, or even a set of APIs. The service layer 213 provides software services to the EDCS 200a. The functionality of the server 202 may be accessible for all service consumers using this service layer. Software services, such as those provided by the service layer 213, provide reusable, defined business functionalities through a defined interface. For example, the interface may be software written in JAVA, C++, or other suitable language providing data in extensible markup language (XML) format or other suitable format.

While illustrated as an integrated component of the server 202 in the EDCS 200a, alternative implementations may illustrate the API 212 and/or the service layer 213 as stand-alone components in relation to other components of the EDCS 200a. Moreover, any or all parts of the API 212 and/or the service layer 213 may be implemented as child or sub-modules of another software module, enterprise application, or hardware module without departing from the scope of this disclosure.

The server 202 includes an interface 204. Although illustrated as a single interface 204 in FIG. 2, two or more interfaces 204 may be used according to particular needs, desires, or particular implementations of the EDCS 200a. The interface 204 is used by the server 202 for communicating with other systems in a distributed environment—including within the EDCS 200a—connected to the network 230; for example, the client 240 as well as other systems communicably coupled to the network 230 (whether illustrated or not). Generally, the interface 204 comprises logic encoded in software and/or hardware in a suitable combination and operable to communicate with the network 230. More specifically, the interface 204 may comprise software supporting one or more communication protocols associated with communications such that the network 230 or interface's hardware is operable to communicate physical signals within and outside of the illustrated EDCS 200a.

The server 202 includes a processor 205. Although illustrated as a single processor 205 in FIG. 2, two or more processors may be used according to particular needs, desires, or particular implementations of the EDCS 200a. Generally, the processor 205 executes instructions and manipulates data to perform the operations of the server 202. Specifically, the processor 205 executes the functionality required to provide multi-level user interface theming and/or associated functionality related to the theming functionality.

The server 202 also includes a memory 206 that holds data for the server 202, client 240, and/or other components of the EDCS 200a. Although illustrated as a single memory 206 in FIG. 2, two or more memories may be used according to particular needs, desires, or particular implementations of the EDCS 200a. While memory 206 is illustrated as an integral component of the server 202, in alternative implementations, memory 206 can be external to the server 202 and/or the EDCS 200a. In some implementations, memory 206 can be configured to store one or more instances of theming data 220.

The theming data 220 includes, among other things, theming files (e.g., theming source code, runtime files, etc.) that define a particular theme. Although illustrated as integral to the server 202, in some implementations, the theming data 220 can be wholly or partially stored remotely from the server 202 (e.g., on another server 202 or other component of the EDCS 200) as long as the theming data 220 is accessible by the server application 207, client application 246, and/or theming engine 247a. In some implementations, access to the theming data 220 can be restricted by security policies and/or procedures (e.g., based on a user role, location, password login, etc.).

The theming data 220 (e.g., images, fonts, CSS, LESS files, etc.) can be represented by any type of suitable data structure in any suitable format. For example, the theming data 220 could be a/in a text file, spreadsheet, database, flat file, binary file, multi-part file, linked list, and/or the like. The theming data 220 can be generated, stored, and/or converted from/into any suitable format or form. In some implementations, the theming data 220 can act as a reference to an internal and/or external storage location, and/or provide functionality to interface with and/or retrieve theming data 220.

The server application 207 is an algorithmic software engine providing functionality associated with server 207. For example, server application 207 can be a particular application server and/or application. In some implementations, the server application 207 can provide server and/or client functionality for multi-level user interface theming, for example, calculations, determinations, analysis, and/or functions consistent with the scope of this disclosure. Further, although illustrated as a single server application 207, the server application 207 may be implemented as multiple server applications 207 on the server 202. In addition, although illustrated as integral to the server 202, in alternative implementations, the server application 207 can be external to the database server 202 and/or the EDCS 200a (e.g., wholly or partially executing on the client 240, other server 202 (not illustrated), etc.).

Once a particular server application 207 is launched, the particular server application 207 can be used, for example by a client 240 or other component of the EDCS 200a to interactively process a task, event, or other information/content associated with the server 202. In some implementations, the server application 207 may be a network-based, web-based, and/or other suitable application consistent with this disclosure.

In some implementations, a particular server application 207 may operate in response to and in connection with at least one request received from other server applications 207, other components (e.g., software and/or hardware modules) associated with another server 202, and/or other components of the EDCS 200a (whether illustrated or not). In some implementations, the server application 207 can be accessed and executed in a cloud-based computing environment using the network 230. In some implementations, a portion of a particular server application 207 may be a web service associated with the server application 207 that is remotely called, while another portion of the server application 207 may be an interface object or agent bundled for processing at a remote client 240. Moreover, any or all of a particular server application 207 may be a child or sub-module of another software module or application (not illustrated) without departing from the scope of this disclosure. Still further, portions of the particular server application 207 may be executed or accessed by a user working directly at the server 202, as well as remotely at a corresponding client 240. In some implementations, the server 202 or any suitable component of server 202 or the EDCS 200a can execute the server application 207.

The client 240 (example configurations illustrated as 240a-240c) may be any computing device operable to connect to or communicate with at least the server 202 and provides functionality for multi-level user interface theming. In general, the client 240 comprises an electronic computing device operable to receive, transmit, process, and store any appropriate data associated with the EDCS 200a. More particularly, among other things, the client 240 can provide functionality for loading, editing, and saving themes (locally and/or on server 202). The client typically includes a processor 244, a client application 246, a theming engine/API 247a/b, a memory 248, and/or an interface 249 interfacing over a system bus 241.

The client application 246 is any type of application that allows the client 240 to navigate to/from, request, view, create, edit, delete, administer, and/or manipulate content associated with the server 202. For example, the client application 246 can present GUI displays to a user loaded from server 202 and/or generated by the server application 207 and/or the theming engine 247a/b. In some implementations, the client application 246 can be and/or include a web browser. In some implementations, the client application 246 can use parameters, metadata, and other information received at launch to access a particular set of data from the server 202, client 240, and/or other components of the EDCS 200a. Once a particular client application 246 is launched, a user may interactively process a task, event, or other information associated with the server 202, client 240, and/or other components of the EDCS 200a. For example, the client application 246 can generate a tool UI loaded from server 202 to provide loading, editing, and saving functionality related to theming. In some implementations, the generated tool UI can load and instantiate the theming engine/API 247a/b. Further, although illustrated as a single client application 246, the client application 246 may be implemented as multiple client applications in the client 240.

Figure 2B:
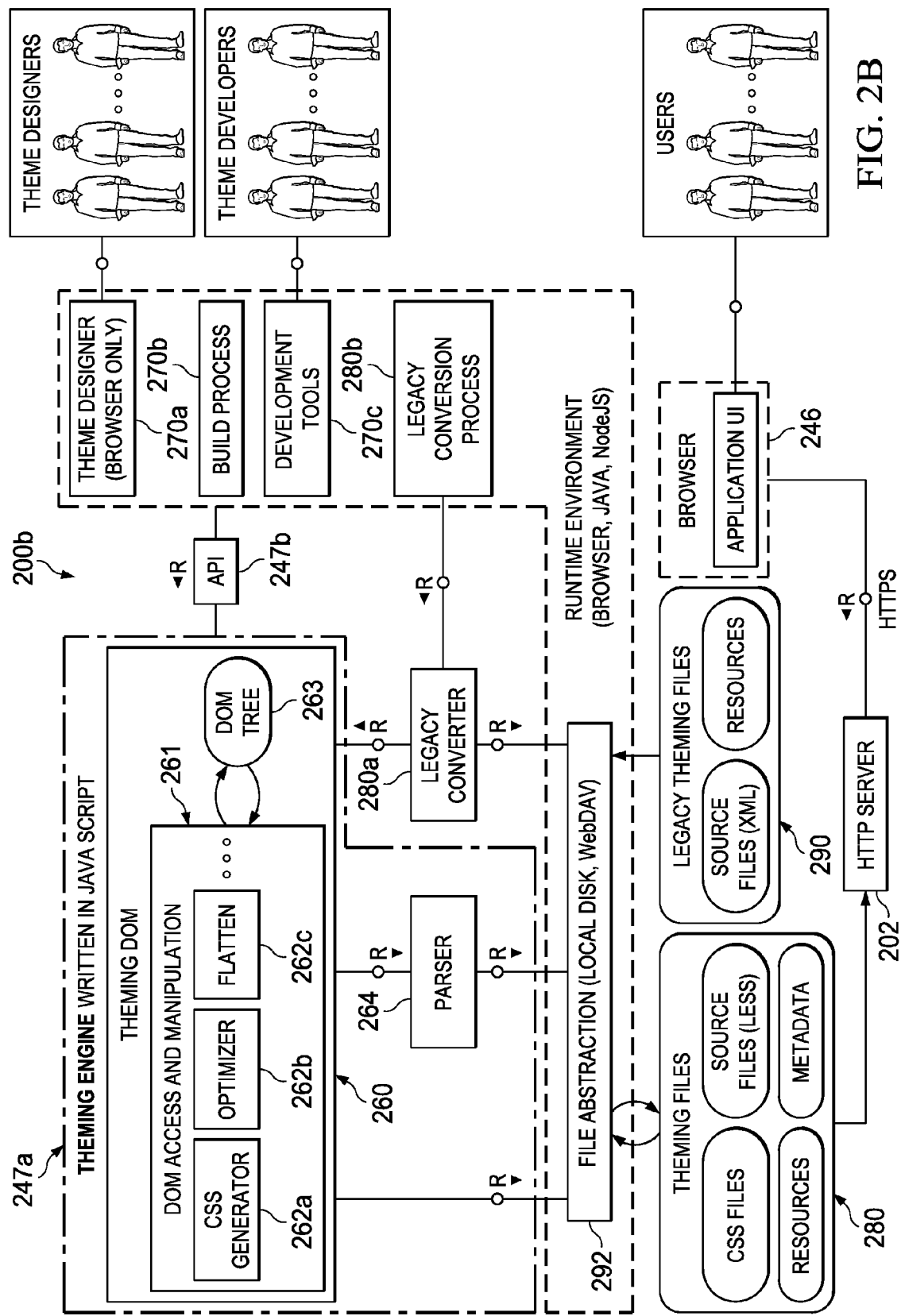
FIG. 2B is a block diagram illustrating a more detailed view of various elements of the EDCS of FIG. 2A according to an implementation.

The theming engine 247a is a software engine that handles all aspects of theme lifecycles (see FIG. 2B for additional detail). The theming engine 247a provides a public API 247b to load, edit, and save design time/runtime theming data and/or appropriate related data from a local persistency (e.g., memory 248) and/or a persistency associated with server 202 (e.g., memory 206). In some implementations, other persistencies (not illustrated) can be accessed by the API 247b in order to read and/or write theming data and appropriate related data. The API 247b is independent from particular UI/theming technologies and hides different UI theming, UI technologies, and UI components from users. The API 247b can also provide functionality to create a theme from a base theme, select theming data (e.g., source and/or runtime files) for editing, get parameters from theming data for editing, set new parameter values, generate theming artifacts, save theme source files, and to build all theming data (e.g., runtime files) from various theming source code (as described above).

In some implementations, the theming engine 247a provides, among other things, functionality to manage theming artifacts (e.g., source and/or runtime files), access local and/or other persistencies, import/export theming data, build a theming domain object model (DOM) from design time theming data, and to produce runtime theming data (e.g., runtime files) from the theming DOM. In some implementations, the API 247b implementation associated with the theming engine 247a can be provided by an extension mechanism to the theming engine 247a. In some implementations, additional/alternate software engines to process theming data into theming artifacts and to provide functionality similar to the API 247b can be registered in the theming engine 247a. In some implementations, more than one API 247b (or additional/alternate software engines) can be associated with a theming engine 247a.

The interface 249 is used by the client 240 for communicating with other computing systems in a distributed computing system environment, including within the EDCS 200a, using network 230. For example, the client 240 uses the interface to communicate with a server 202 as well as other systems (not illustrated) that can be communicably coupled to the network 230. The interface 249 may be consistent with the above-described interface 204 of the server 202. The processor 244 may be consistent with the above-described processor 205 of the server 202. Specifically, the processor 244 executes instructions and manipulates data to perform the operations of the client 240, including the functionality required to send requests to the server 202 and to receive and process responses from the server 202.

The memory 248 typically stores objects and/or data associated with the purposes of the client 240 but may also be consistent with the above-described memory 206 of the server 202 or other memories within the EDCS 200a and be used to store data similar to that stored in the other memories of the EDCS 200a for purposes such as backup, caching, and the like. In some implementations, memory 240 can store theming data 250. Theming data 250 can be local copies of theming data 220 as described above or theming data unique to client 240 and not yet written to server 202. For example, once local changes to a theme are complete, a user can store appropriate theming data 250 on local memory 248 and/or write the changes back to server 202.

Further, the illustrated client 240 includes a GUI 242 (illustrated as associated with client 240a) that interfaces with at least a portion of the EDCS 200a for any suitable purpose. For example, the GUI 242 may be used to view data associated with the client 240, the server 202, or any other component of the EDCS 200a. In particular, in some implementations, the client application 246 may act as a tool UI to interact with the theming engine/API 247a/b, server application 207, and/or other components of server 202. For example, the GUI 242 can be used, in some implementations, to load, edit, and/or save theming data associated with a theme.

There may be any number of clients 240 associated with, or external to, the EDCS 200a. For example, while the illustrated EDCS 200a includes one client 240 communicably coupled to the server 202 using network 230, alternative implementations of the EDCS 200a may include any number of clients 240 suitable to the purposes of the EDCS 200a. Additionally, there may also be one or more additional clients 240 external to the illustrated portion of the EDCS 200a that are capable of interacting with the EDCS 200a using the network 230. Further, the term "client" and "user" may be used interchangeably as appropriate without departing from the scope of this disclosure. Moreover, while the client 240 is described in terms of being used by a single user, this disclosure contemplates that many users may use one computer, or that one user may use multiple computers.

The illustrated client 240 is intended to encompass any computing device such as a desktop computer, laptop/notebook computer, wireless data port, smart phone, personal data assistant (PDA), tablet computing device, one or more processors within these devices, or any other suitable processing device. For example, the client 240 may comprise a computer that includes an input device, such as a keypad, touch screen, or other device that can accept user information, and an output device that conveys information associated with the operation of the server 202 or the client 240 itself, including digital data, visual and/or audio information, or a GUI 242, as illustrated specifically with respect to the client 240a.

FIG. 2B is a block diagram illustrating a more detailed view 200b of various elements of the EDCS 200 of FIG. 2A according to an implementation.

As illustrated, the theming engine 247a is modular and includes a theming document object model (DOM) 260, and a parser 264. The DOM 260 is an in-memory representation of a document (e.g., an XML file). In the theming infrastructure, the DOM 260 can be, for example, a representation of a LESS file in memory. The modular nature of the theming engine 247a permits modification/enhancement to support different UI technologies. While illustrated as being written in JAVASCRIPT for portability between multiple operating system environments, any appropriate software language/script can be used for the theming engine 247a or any component of the associated illustrated architecture of FIG. 2B.

In some implementations, the theming engine 247a consists of two different layers: 1) theming engine API 247b and the theming engine 247a implementation.

The API 247b is a public API providing basic theming functionality and an interface for various tools/processes (e.g., theme designer tools 270a, development tools 270b, build processes 270c, and a legacy converter 280a/legacy conversion process 280b) to access theming artifacts (runtime & design time data) from a persistency (e.g., theming framework 280 and Legacy Theming Files 290). As stated above, the API 247b provides functionality to load, edit, and save design time/runtime theming data and/or appropriate related data from a local persistency (e.g., memory 248 in FIG. 2A) and/or a persistency associated with server 202 (e.g., memory 206 in FIG. 2A). In some implementations, memories 248 and 206 can contain one or more instances of theming files (framework) 280 and/or legacy theming files 290 as illustrated in FIG. 2B. In some implementations, other persistencies (not illustrated) can be accessed by the API 247b in order to read and/or write theming data and appropriate related data. The API 247b is independent from particular UI/theming technologies and hides different UI theming, UI technologies, and UI components from users. The API 247b can also provide functionality to create a theme from a base theme, select/load theming data (e.g., source and/or runtime files) for editing, change theme parameters, get parameters from theming data for editing, set new parameter values, generate theming artifacts, save theme source files, and/or to build all theming data (e.g., runtime files) from various theming source code (as described above).

The API 247b also hides different UI theming technologies, UI technologies, and UI components as well as providing access to parameters. Because parameters can be determined and theming artifacts can be created from the parameters different ways, the theming engine 247a users are abstracted from these technical details by the API 247b and allows development and use of varying tools to interface with the theming engine 247a (e.g., theme designer 270a). In some implementations, API 247b functionality can be implemented using an extension mechanism and/or methods can be registered in the theming engine 247a.

The theming engine 247a implementation provides for management of theming artifacts, persistencies associated with the theming engine 247a (e.g., memories 248 and 202 in FIG. 2A), import/export of theming files 280/legacy theming files 290, the parser 264, and the CSS generator 262a. The parser 264 is used to build the theming DOM out of design time files (e.g., theming files 280). The CSS generator 262a is used to produce CSS runtime files from the theming DOM 260.

The use of JAVASCRIPT, as described above, also permits one implementation of the theming engine 247a to be used on multiple technology stacks (both front- and back-end) and platforms. This flexibility reduces not only development efforts, but it also ensures consistency between the different technology stacks/platforms. For example, supported platforms can include build infrastructures using JAVA/RHINO, JAVA application servers using JAVA/RHINO, databases, web browsers, other JAVA-executing technologies, etc.

In some implementations, the theming engine 247a (and associated components) can execute on the client 240 (e.g., to be used as a tool like the theme designer 270a) and/or on the server 202 (e.g., to create/build a theme without the need of a UI—an example could be when required to rebuild a theme when a portion of the theming data was changes by applying patch to server 202).

Theming files 280 describing a theme are stored in a local and/or remote persistent file-system-like repository. The illustrated examples are only one possible implementation, and those of skill in the art will appreciate that any appropriate file system/persistency implementation consistent with this disclosure may be used. For example, in some implementations, an abstract file system API can be incorporated within and/or remote theming engine 247a. FIG. 2B illustrates a remotely situated abstract file system API as file abstraction 292. File abstraction 292 provides an abstract persistency layer for file read/write access between the theming engine and either a local/remote persistency storing theming frameworks. The theming engine 247a does not access a specific file system implementation, but calls, for example, methods associated with the file abstraction 292. From an architectural point-of-view, implementations of the various file systems are outside of the theming engine 247a. An example file abstraction could include an implementation for HTTP/Web-DAV access or a JAVA API to directly access resources on the server 202. In some implementations, one or more of the following implementations can be included for use: 1) local file system: Access file system from a browser. This has the advantage that themes can be generated locally without the need for a server, 2) HTTP: a well-known technology with many implementations available (e.g. APACHE, TOMCAT, etc.). It can be also easily implemented for any application server, 3) JAVA API: The JAVA API allows the embedding of the theming engine into a JAVA application server. File system access of the theming engine can then be redirected to any persistency of the JAVA application server.

In some implementations, the file system and the JAVASCRIPT approach also reduces TCO for support. This is because it is becomes possible to reproduce an error situation by copying a duplicate of the theming resources (e.g., JAVASCRIPT and themes) and execute it on a test system within to reproduce the error without the need of having access to a customer system.

In some implementations, new themes can be created based on existing themes. The new theme "inherits" all artifacts, design time data and parameter values by default from its base theme. In other implementations, new themes can be created from "scratch," meaning that a creator will need to specify parameters values for the new theme. In some implementations, some parameters/values can be included by default and/or selectable from a library using a GUI-type tool (not illustrated). In addition, in some implementations, the new theme will only contain those parameters that are different (i.e., deltas) compared to the base theme. Additionally a new theme can also contain additional design time (source) data and other kinds of artifacts (e.g., images, description, security data, etc.). The advantage of this approach is that such a new theme is more robust and efficient. For example, since theming data is often changed for bug fixes or further development, to apply changes requires the new theme runtime files to be regenerated. Further the amount of stored data is reduced and the ability to determine the differences between themes can be a trivial operation.

New theme theming artifacts (runtime data) will be based upon the data of the base theme and the new theme. Parameters and sources from the base theme will be included into the new theme. Further artifacts, such as images, can be used in the new theme by reference using a relative path (e.g., . . . /baseTheme/image.png) from a base theme theming source code. Theming document object model (DOM) 260 includes the structure of the theming artifacts and their associated parameters and is loaded by the parser 264. For example, a particular theming DOM 260 can represent all information from the framework down to, for example, the "background-color" definition in a hierarchical structure. The theming DOM 260. The parser 264 can load LESS files, parse them, and bring the LESS files to a DOM representation represented by the theming DOM 260. An example theming DOM 260 representation can include a root node with a "context" node. The context node has children from type "Framework" node. This again has children from type "Library" node which again has "Theme" nodes. Each "Theme" node can have "File" nodes and each file contains, annotations, parameter definitions, CSS rules, import statements, comments etc. Each CSS rule can have CSS declarations of different types. In this example, each element or node element contains its own capabilities and methods. Other implementations are envisioned depending upon the particular needs and desires of a theme. Each theming framework may have different logics regarding parameter locations, resources and inheritance so an extensibility concept for specific framework implementations permits a theming framework to overwrite the functionality of a default implementation.

Theming DOM 260 includes a DOM access and manipulation (AAM) 261 and DOM tree 263. DOM AAM 261 includes a CSS generator 262a, optimizer 262b, and flatten 262c. The AAM 261 contains methods such as to set a theming parameter value, add a new file, etc. The DOM tree 263 is an object tree providing an in-memory representation of the theming data. For example, nodes in the tree can be CSS rule definitions, included LESS files, parameters, parameter values, etc. The CSS generator 262a takes data, for example a LESS file, and resolves all included data (e.g., from a database theme) an creates a CSS from it. For example, it replaces parameters with actual values. The optimizer 262b can, for example, remove duplicated parameter assignments from LESS files and/or other optimizations. The flatten 262c component can create a theme with has no more dependencies on a base theme. The theme can be copied to any location without the need to copy a base theme with it. For example, the flatten 262c component output is useful to copy a theme onto a general HTTP server.

As parameters can have fixed or derived values, the theming engine 247a defines expressions that can be evaluated to derive parameter values. In some implementations, LESS functionality is used to calculate CSS property values. In some implementations, the theming engine 247a can be enhanced by additional expressions by registering the additional expressions with the theming engine 247a using a registration system/methodology. In some implementations, parameter evaluation/derivation can depend upon theming artifact references. For example, a theming artifact including parameters from a central parameter definition can access any parameters included in the central parameter definition.

Within the theming files 280, support for different UI technologies is provided partially by using one theming format. In some implementations, for all UI components using CSS, the LESS format is used to store theming source code (files). CSS files required for UI components will be generated from the LESS theming source code files. Metadata allows configuration of particular folder structures and file locations for various UI components. The metadata which can be configured and adapted for special needs of each theming framework. If a metadata file is not present, a default metadata file configuration is generated. Additional resources (e.g., images, a tool UI, theming engine 247a/API 247b, CSS generator 262a, plugins such as a migration plugin, etc.).

In some implementations, there is one implementation of the theming engine 247a and an associated tool UI. Each theming framework (stored in theming files 280) has its storage of theming source files that can share data from common theming data. All theming frameworks integrate the theming engine 247a in their build infrastructure. The build result of each framework contains the generated CSS files and the theming source files. Following a build, the generated theming files (e.g., CSS) files, the LESS theming source code files and accompanying resources can be deployed on an arbitrary mime repository (e.g., memory 248/a local disk of FIG. 2A). This repository needs to be able to grant HTTP access (right bottom corner) to an HTTP server.

In some implementations, an internet browser can start the tool UI from this repository. In this implementation, the tool UI loads and instantiates the theming engine 247a and associated processes. The theming engine 247a then loads the necessary theming source files and can generate CSS files and generate a live preview of a theme for user review and appropriate actions. Changes to a theme or generation of a completely new theme can be performed locally until the user is confident with the theme result. The user can then store the LESS files, resources, metadata, and CSS files on the mime repository/local disk or write it back to the server 202 repository.

For different use cases, it is possible to implement a different parser 264 and CSS generator 262a. The parser 264 needs to return a theming DOM 260 fragment that exposes parameters that can interact with parameters from other technologies. In addition to that stated above, the CSS generator 262a is able to create a theming artifact for the different UI technology out of the theming DOM. For example, a UI component requires an XML file containing color values. A source XML file is provided containing parameter names instead of XML files. In another XML file, default values (or expressions to determine values) for the parameters are provided. The parser 264 is able to read the two XML files in a theming DOM fragment. This makes it possible to access the parameters from a theming tool without the need to understand the actual XML files. The CSS generator 262a is able to write the requested XML files and to resolve, among other things, any relative paths. The CSS generator 262a acts as a compiler replacing, for example, LESS expressions with expression evaluation results so that a web browser can understand the results.

The theming engine 247a can also the re-use parameters between different UI components. This is realized using an import mechanism and makes it possible to define central assets that can be shared over different UI components. Another benefit is that multiple UI components can be affected immediately by changing the central parameters.

For a new theme, the theming engine 247a can automatically determine where a parameter is stored by analyzing where the parameter was originally defined in the base theme. The parameter will then be saved to the same destination, but in a new theme. This determination is performed automatically in some implementations and any theming tool does not need to account for it unless desired to allow a user to make changes. For example, theming based on an HTML file using a CSS file "UR/ls/xyz/standards.css" should be changed. The source LESS file from the same location will be loaded and includes a further LESS file (base.less):

UR/baseLib/xyz/base.less:
@buttonBackground: blue;
UR/ls/xyz/standards.less:
@import "UR/baseLib/xyz/base.less"
@buttonBackground: red;

When setting "@buttonBackground" it will be stored in the new file:

UR/ls/<new_theme>/standards.less according to the location in the original theme "xyz."

The legacy converter 280a/legacy conversion process 280b permit migration of theming data from existing theming solutions, for example an older web portal or other web application theming design, into the new theming infrastructure. The introduction of the migratory feature allows retrofitting of existing application to a new common theme, reduces re-theming effort, protects an investment of a customer in theming, and can reduce TCO for the customer. The migration helps to protect the investment of the customer in theming and by this reduces the effort of migrating. The legacy converter 280a/legacy conversion process 280b can execute on the server 202, client 240, or both depending upon migration needs. For example, an automated migration might be configured to occur on the server 202. Another example might be a manual migration performed on the client with a UI allowing the importation of an older theme. Functionality of the legacy converter 280a/legacy conversion process 280b include adapting the theming engine 247a to existing file system structures by configuration to prevent the need to re-engineer existing file systems. Old files (e.g., old custom themes) can be migrated using the legacy converter 280a. In some implementations, the legacy converter 280a can be also implemented in JavaScript to keep it portable. In some implementations, once the migration of all associated theming data/files has been completed, the migrated data/files are converted to the new theming infrastructure. In some instances, the new infrastructure supports calculating theming parameter values from other theming parameters. This makes it possible to remove redundant/duplicate theming parameters, reducing the amount of design time data in migrated themes and making future theming changes more efficient.

Figure 3:
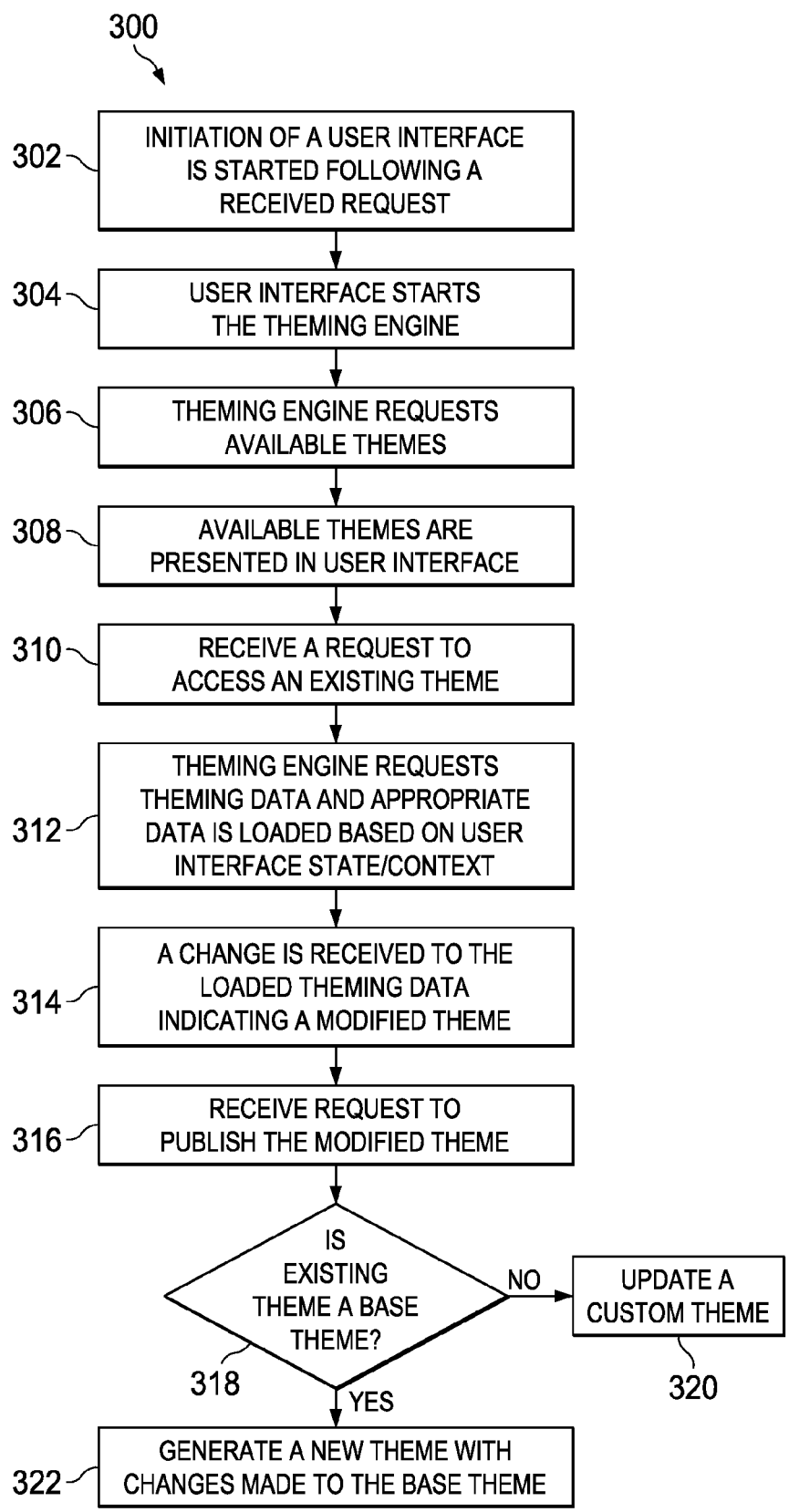
FIG. 3 is a flow chart illustrating a method for providing a multi-level user interface theming engine according to an implementation.

FIG. 3 is a flow chart illustrating a method for providing multi-level user interface theming according to an implementation. For clarity of presentation, the description that follows generally describes method 300 in the context of FIGS. 1 and 2A-2B. However, it will be understood that method 300 may be performed, for example, by any other suitable system, environment, software, and hardware, or a combination of systems, environments, software, and hardware as appropriate. In some implementations, various steps of method 300 can be run in parallel, in combination, in loops, or in any order.

At 302, a request is received to start a user interface, for example a tool UI. A start of the user interface is initiated. From 302, method 300 proceeds to 304.

At 304, following start of the user interface, the user interface starts a theming engine. From 304, method 300 proceeds to 306.

At 306, the theming engine requests available existing themes. In some implementations, the theming engine can request available existing themes from the server repository and/or a local repository on a client. From 306, method 300 proceeds to 308.

At 308, available themes are presented to user in user interface based on response(s) to requests for available existing themes. From 308, method 300 proceeds to 310.

At 310, a request is received through the user interface to access an existing theme. From 310, method 300 proceeds to 312.

At 312, the theming engine requests the loading of appropriate portions of the theme based on the contextual state of the user interface. For example, if the default edit page for the user interface displays QT parameters for the primary web application index page, only theme data necessary to populate the user interface will be requested and loaded. In some implementations, the appropriate data is determined based, at least in part, on the needs of a preview page in the user interface. In some implementations, the entire theme may be loaded on a local persistency (e.g., a local disk, etc.) for immediate access by the user interface. In these implementations, the local persistency may hold all edits to the theme until transmitted back to the server. In some implementations, a separate process associated with the theming engine, such as an importer process, is used to load appropriate portions of a theme. In another example, the loaded theme data can be based on a user role, security permissions, and similar. From 312, method 300 proceeds to 314.

At 314, a change is received to the loaded theme data indicating a modified theme. The received modified theme data (e.g., delta change files) can be stored in a temporary memory location, such as on a local disk, and/or the server until a determination is made as to whether the existing theme is a base theme. From 314, method 300 proceeds to 316.

At 316, a request is received to publish the modified theme. From 316, method 300 proceeds to 318.

At 318, a determination is made whether the existing theme was a base theme. The determination is performed because a software vendor can provide a base theme which can be adjusted by a customer to generate custom themes containing modifications on top of a base theme. Because the base theme is delivered by the software vendor, they should not be modified by the customer or conflicts can occur when the base them itself needs to be update due to a patch or an upgrade. If the existing theme was not a base theme, method 300 proceeds to 320. If the existing theme was a base theme, method 300 proceeds to 322.

At 320, the custom theme selected as the existing theme is updated. For example, delta changes reflecting the changes to the custom theme are added to the theming framework. From 320, method 300 stops.

At 322, a new theme is generated based on the base theme and appropriate changes to apply to the base theme (e.g., delta changes) are added to the theming data for the new theme. Note that the new theme has a reference to its base theme and any delta changes are applied with a future loading of the new theme. In some implementations, only one delta change is stored for each delta (the delta is an aggregate of all deltas). In other implementations, all deltas can be stored to provide historical reference. From 322, method 300 stops.

In some implementations at 320 and 322, a separate process associated with the theming engine, such as an exporter process, is used to export appropriate portions of a theme for updating/storage. In some implementations, all changes are stored to a local repository and then transferred to the server repository.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
   initiating a start of a user interface following receipt of a theming request to modify aspects of an existing theme, the user interface providing at least two levels of theming functionality in a single infrastructure;
   requesting, with a computer, available existing themes for presentation in the user interface;
   receiving a request to access a particular existing theme;
   receiving theming data responsive to a generated request to load the particular existing theme; and
   receiving a request to publish modified theming data, wherein the modified theming data is separated into at least the source of the particular existing theme, parameter values associated with the at least two levels of theming functionality, and custom source code from source level editing of the particular existing theme.

2. The method of claim 1, wherein the user interface starts the theming engine.

3. The method of claim 1, wherein the available existing themes are requested using a file abstraction application programming interface.

4. The method of claim 1, wherein the theming data is loaded based on a contextual state of the user interface.

5. The method of claim 1, wherein the modified theming data indicates a modified theme associated with the particular existing theme.

6. The method of claim 1, further comprising determining whether the particular existing theme is a base theme.

7. The method of claim 6, further comprising updating a custom theme on a determination that the particular existing theme is not a base theme.

8. The method of claim 6, further comprising generating a new theme including delta changes to be applied to the particular existing theme based on a determination that the particular existing theme is a base theme.

9. A non-transitory, computer-readable medium storing computer-readable instructions executable by a computer and operable to:
   initiate a start of a user interface following receipt of a theming request to modify aspects of an existing theme, the user interface providing at least two levels of theming functionality in a single infrastructure;
   request, with a computer, available existing themes for presentation in the user interface;
   receive a request to access a particular existing theme;
   receive theming data responsive to a generated request to load the particular existing theme; and
   receive a request to publish modified theming data, wherein the modified theming data is separated into at least the source of the particular existing theme, parameter values associated with the at least two levels of theming functionality, and custom source code from source level editing of the particular existing theme.

10. The medium of claim 9, wherein the user interface starts the theming engine.

11. The medium of claim 9, wherein the available existing themes are requested using a file abstraction application programming interface.

12. The medium of claim 9, wherein the theming data is loaded based on a contextual state of the user interface.

13. The medium of claim 9, wherein the modified theming data indicates a modified theme associated with the particular existing theme.

14. The medium of claim 9, further operable to determine whether the particular existing theme is a base theme.

15. The medium of claim 14, further operable to update a custom theme on a determination that the particular existing theme is not a base theme.

16. The medium of claim 14, further operable to generate a new theme including delta changes to be applied to the particular existing theme based on a determination that the particular existing theme is a base theme.

17. A system, comprising:
   a memory configured to contain theming data;
   at least one computer interoperably coupled with the memory and configured to:
      initiate a start of a user interface following receipt of a theming request to modify aspects of an existing theme, the user interface providing at least two levels of theming functionality in a single infrastructure;
      request, with a computer, available existing themes for presentation in the user interface;
      receive a request to access a particular existing theme;
      receive theming data responsive to a generated request to load the particular existing theme; and
      receive a request to publish modified theming data, wherein the modified theming data is separated into at least the source of the particular existing theme, parameter values associated with the at least two levels of theming functionality, and custom source code from source level editing of the particular existing theme.

18. The system of claim 17, wherein the theming data is loaded based on a contextual state of the user interface.

19. The system of claim 17, wherein the modified theming data indicates a modified theme associated with the particular existing theme.

20. The system of claim 17, further configured to:
determine whether the particular existing theme is a base theme;
update a custom theme based on a determination that the particular existing theme is not a base theme; and
generate a new theme including delta changes to be applied to the particular existing theme based on a determination that the particular existing theme is a base theme.

* * * * *